US008230459B2

(12) United States Patent
Kawada et al.

(10) Patent No.: US 8,230,459 B2
(45) Date of Patent: Jul. 24, 2012

(54) PROGRAM GUIDE PROVIDING SYSTEM, PROGRAM GUIDE PROVIDING APPARATUS, PROGRAM GUIDE PROVIDING METHOD, AND PROGRAM GUIDE PROVIDING PROGRAM

(75) Inventors: Masato Kawada, Tokyo (JP); Honggang Wang, Kanagawa (JP); Norio Kobota, Kanagawa (JP); Tomoya Oikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 622 days.

(21) Appl. No.: 12/257,759

(22) Filed: Oct. 24, 2008

(65) Prior Publication Data

US 2009/0113482 A1    Apr. 30, 2009

(30) Foreign Application Priority Data

Oct. 25, 2007    (JP) ................. P2007-277852

(51) Int. Cl.
*H04H 60/32*    (2008.01)
(52) U.S. Cl. ............................. 725/14; 725/9
(58) Field of Classification Search ............... 725/9, 14
See application file for complete search history.

(56) References Cited

U.S. PATENT DOCUMENTS

| 5,754,939 | A * | 5/1998 | Herz et al. .................... 455/3.04 |
|---|---|---|---|
| 6,317,881 | B1 * | 11/2001 | Shah-Nazaroff et al. ........ 725/24 |
| 2004/0107439 | A1 * | 6/2004 | Hassell et al. ................... 725/44 |
| 2005/0120391 | A1 * | 6/2005 | Haynie et al. ................. 725/135 |
| 2007/0157221 | A1 | 7/2007 | Ou et al. |
| 2008/0109853 | A1 * | 5/2008 | Einarsson et al. .............. 725/62 |
| 2008/0222106 | A1 * | 9/2008 | Rao et al. ........................... 707/3 |

FOREIGN PATENT DOCUMENTS

EP    1 349 391    10/2003

OTHER PUBLICATIONS

European search report; Reference P035224EP SRD; search completed Nov. 23, 2011.
European search report; Reference P035224EP SRD; search completed Dec. 29, 2011.
"IPTV architecture: Dedicated substem for IPTV function in NGN", Sep. 24, 2007, ETSI Draft; 02049-NGNV008, ETSI, 650, Route Des Lucioles; F-06921 Sophia-Antipolis; France.
Kuhne R, et al..; "Charging in the IP Multimedia Subsystem: A Tutorial", IEEE Communications Magazine, IEEE Service Center, Piscataway, U.S. vol. 45, No. 7, Jul. 1, 2007.

* cited by examiner

*Primary Examiner* — Kristine Kincaid
*Assistant Examiner* — Robert Hance
(74) *Attorney, Agent, or Firm* — Frommer Lawrence & Haug LLP; William S. Frommer; Ellen Marcie Emas

(57) ABSTRACT

Disclosed herein is a program guide providing system including: a terminal; a content providing server including a service providing section for providing programs and a related service to the terminal in response to a request from the terminal; a SIP proxy server; a program guide providing server including a communication history acquisition section for acquiring a communication history between the content providing server and the terminal, a communication history storage section, an audience situation calculation section for calculating an audience situation concerning each of the programs based on the communication history, a program guide generation section for generating a program guide in which each program is assigned an indicator based on the audience situation, and a program guide providing section for providing the program guide to the terminal; and an NGN to which the terminal, the content providing server, the SIP proxy server, and the program guide providing server are connected.

7 Claims, 6 Drawing Sheets

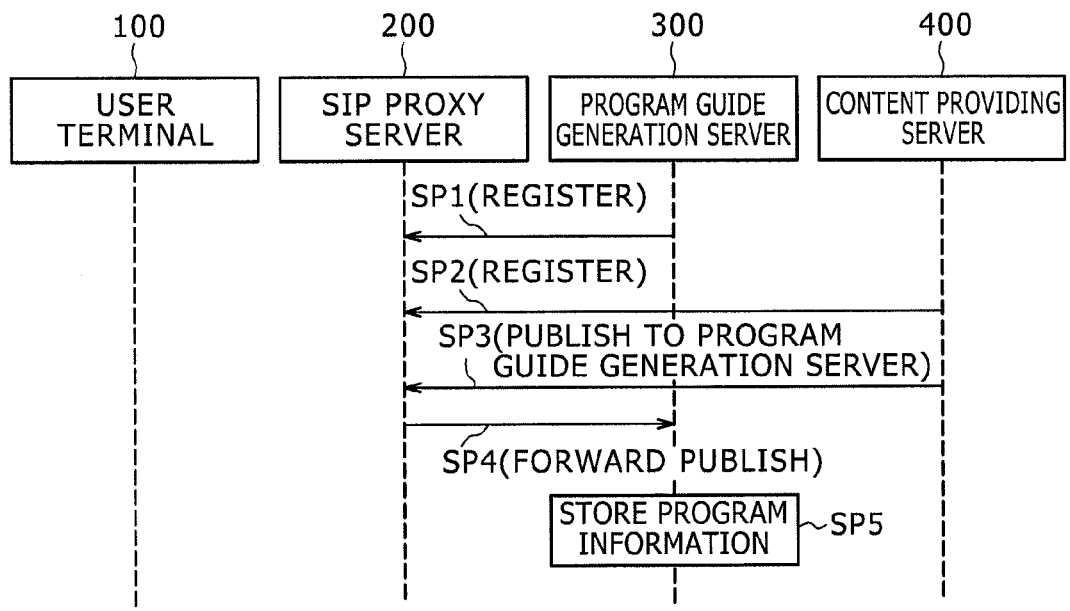
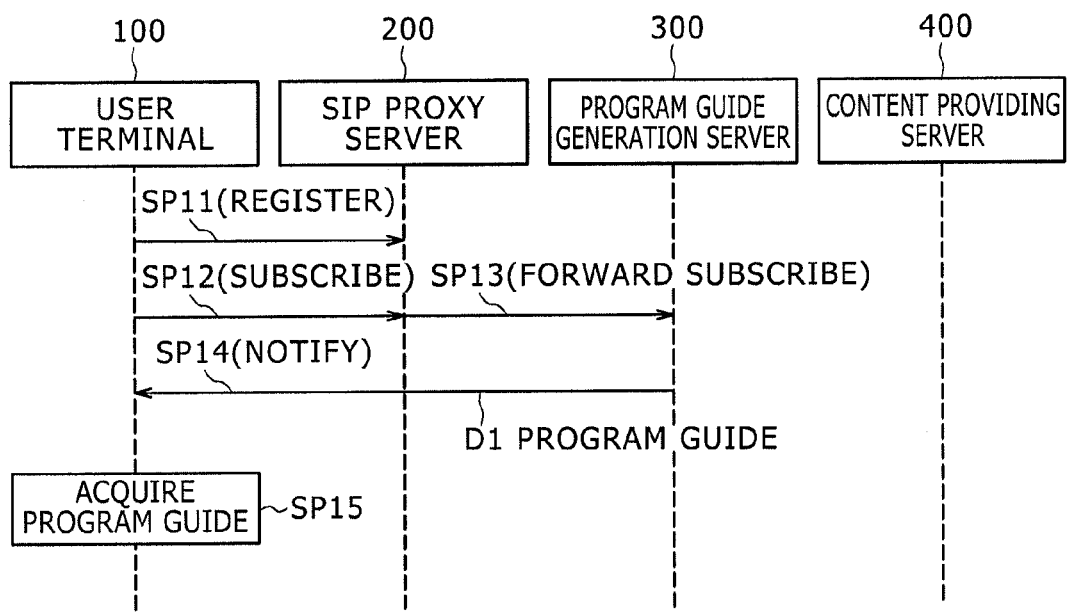

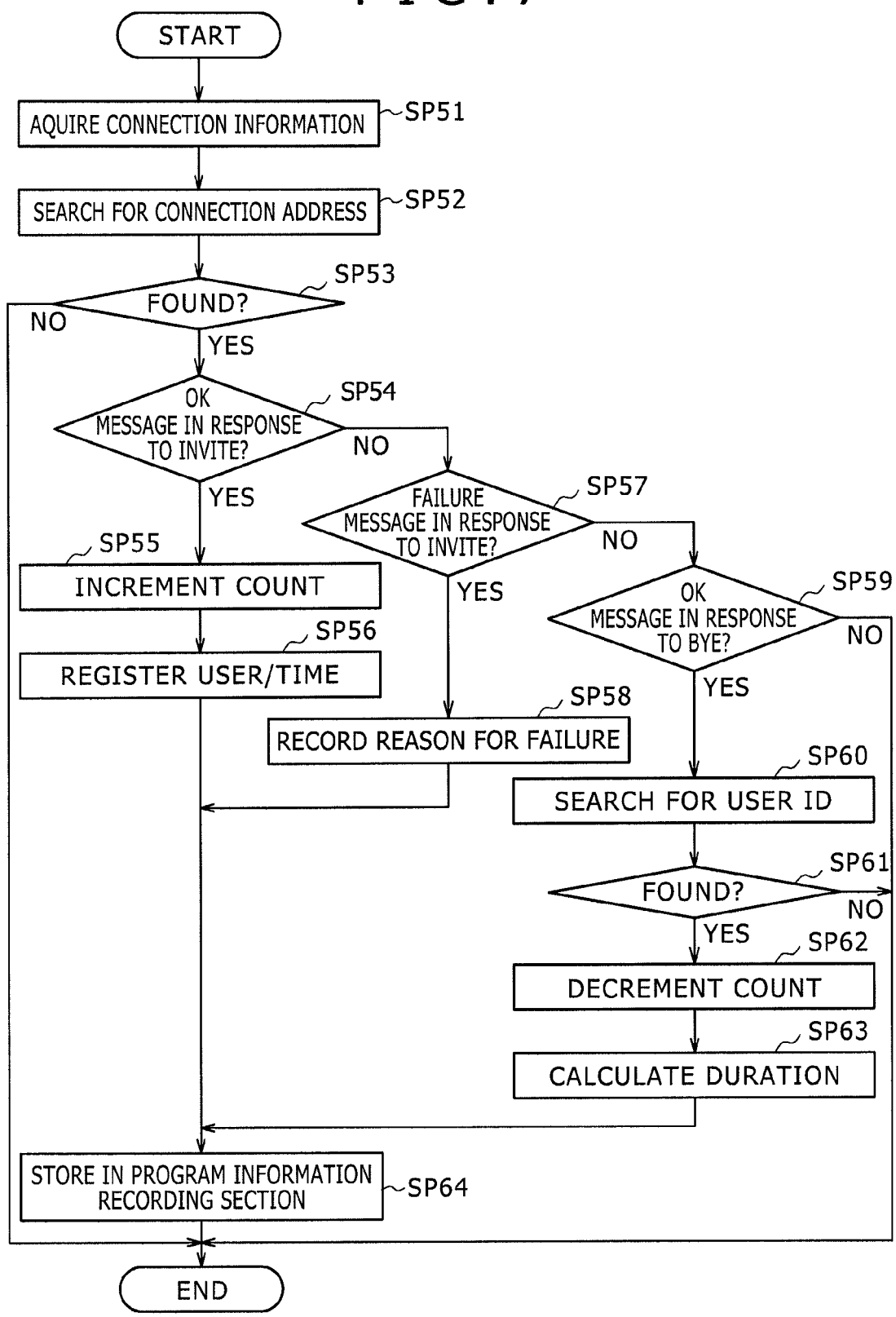

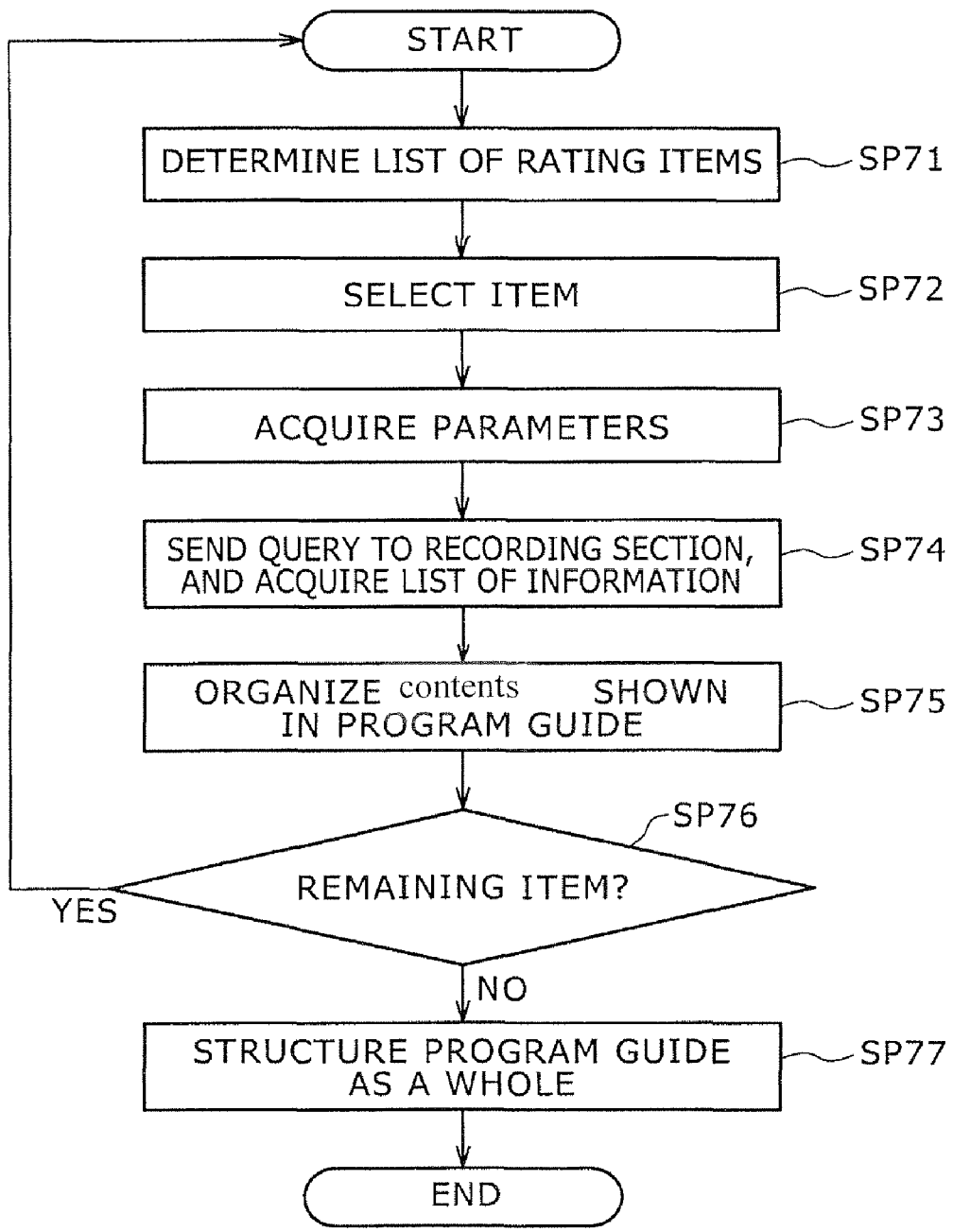

PROGRAM GUIDE PROVIDING SYSTEM, PROGRAM GUIDE PROVIDING APPARATUS, PROGRAM GUIDE PROVIDING METHOD, AND PROGRAM GUIDE PROVIDING PROGRAM

CROSS REFERENCES TO RELATED APPLICATIONS

The present invention contains subject matter related to Japanese Patent Application JP 2007-277852, filed in the Japan Patent Office on Oct. 25, 2007, the entire contents of which being incorporated herein by reference.

BACKGROUND OF THE INVENTION

1. Field of the Invention

The present invention relates to a program guide providing system, a program guide providing apparatus, a program guide providing method, and a program guide providing program, which are suitably applied, for example, to the case where a program guide in which programs are rated or ordered is provided.

2. Description of the Related Art

In existing Internet protocol (IP) network environments, typified by the Internet, no service has been offered of delivering a program guide or the like that allows users to search for a variety of media services in a unified manner. Such program guides or the like have been provided independently for each service. In the field of current terrestrial TV, view survey instruments are provided to a sample of viewers, and based on the view survey instruments, audience ratings are calculated individually.

In some techniques (see, for example, Japanese Patent Laid-Open No. 2001-344196, hereinafter referred to as Patent Document), logs of usage of the Internet by users who have made a contract with an information storage site are acquired and managed in a centralized manner by the information storage site/server, and when a user terminal of each of the registered users accesses a Web site/server, information about the terminal transmitted to the Web site/server is transmitted to the information storage site/server, and history information is generated on a registered user basis, or alternatively, the user terminal of each of the registered users accesses the Web site via the information storage site so that an access log of the registered user is acquired by the information storage site/server.

In recent years, a move has been increasingly active toward construction of a next generation network (NGN) by replacing a conventional circuit switching telephone network with an Internet protocol (IP)-based network. The NGN has a band securing feature and a security feature, and performs session control using the session initiation protocol (SIP). The NGN allows not only a unidirectional delivery of contents such as videos but also two-way video communication and related services such as a chat service. Thus, the NGN is capable of providing a variety of content services beyond the limits of traditional viewing or listening-only broadcasting.

SUMMARY OF THE INVENTION

The technique as described in Patent Document mentioned above has a problem of limited versatility, because the logs are acquired only with respect to the registered users. Moreover, this technique has a problem of inability to calculate an audience situation based on connection information about the users and deliver, to the users, a program guide in which the programs are rated.

The present invention addresses the above-identified, and other problems associated with methods and apparatuses in the past, and provides a program guide providing system, a program guide providing apparatus, a program guide providing method, and a program guide providing program which allow the program guide in which the programs are rated or ordered to be generated and provided to the users, with respect to the content services provided on the NGN, such as unidirectional, two-way, and chat services.

According to one embodiment of the present invention, there is provided a program guide providing system including: a terminal; a content providing server configured to provide a content to the terminal; a SIP proxy server configured to perform routing of SIP messages; a program guide providing server configured to provide, to the terminal, a list of services offered by the content providing server as a program guide; and a next generation network (NGN) to which the terminal, the content providing server, the SIP proxy server, and the program guide providing server are connected. The content providing server includes a service providing section for providing a variety of programs and a related service to the terminal in response to a request from the terminal. The program guide providing server includes: a communication history acquisition section for acquiring, via the SIP proxy server, a communication history between the content providing server and the terminal; a communication history storage section for storing the communication history acquired by the communication history acquisition section; an audience situation calculation section for calculating an audience situation concerning each of the programs based on the communication history stored in the communication history storage section; a program guide generation section for assigning an indicator to each program based on the audience situation calculated by the audience situation calculation section, and generating a program guide in which each program is assigned the indicator; and a program guide providing section for providing the program guide generated by the program guide generation section to the terminal.

According to this program guide providing system, the program guide in which the programs are assigned the indicators based on the audience situation can be provided to users.

According to another embodiment of the present invention, there is provided a program guide providing apparatus for providing a program guide via a next generation network (NGN), the apparatus including: a call connection monitoring section for monitoring, via a SIP proxy server, a call connection from a terminal to a connection address corresponding to any of a variety of programs and a related service provided by a content providing server that provides the variety of programs and the related service to the terminal in response to a request from the terminal, the terminal being connected to the next generation network; a connection data storage section for storing connection data obtained by the monitoring of the call connection monitoring section; an audience situation calculation section for calculating an audience situation based on the connection data stored in the connection data storage section; a program guide generation section for generating the program guide based on the audience situation calculated by the audience situation calculation section; and a program guide providing section for providing the program guide generated by the program guide generation section to the terminal.

According to yet another embodiment of the present invention, there is provided a program guide providing method for providing a program guide via a next generation network (NGN), the method including the steps of: a call connection monitoring section monitoring, via a SIP proxy server, a call connection from a terminal to a connection address corresponding to any of a variety of programs and a related service provided by a content providing server that provides the variety of programs and the related service to the terminal in response to a request from the terminal, the terminal being connected to the next generation network; a connection data storage section storing a log of the call connection monitored in the monitoring as connection data; an audience situation calculation section calculating an audience situation based on the connection data stored in the storing; a program guide generation section generating the program guide based on the audience situation calculated in the calculating; and a program guide providing section providing the program guide generated in the generating to the terminal.

According to yet another embodiment of the present invention, there is provided a program guide providing program for providing a program guide via a next generation network (NGN), the program causing a computer to perform the steps of: monitoring, via a SIP proxy server, a call connection from a terminal to a connection address corresponding to any of a variety of programs and a related service provided by a content providing server that provides the variety of programs and the related service to the terminal in response to a request from the terminal, the terminal being connected to the next generation network; storing a log of the call connection monitored in the monitoring as connection data; calculating an audience situation based on the connection data stored in the storing; generating the program guide based on the audience situation calculated in the calculating; and providing the program guide generated in the generating to the terminal.

According to the present invention, it is possible to provide a program guide in which a variety of content services offered over the NGN are rated or ordered. As a result, the user is able to select a program with increased flexibility and in a variety of manners, by referring to the program guide.

BRIEF DESCRIPTION OF THE DRAWINGS

FIG. 3 is a flowchart illustrating a procedure for delivering program information to a program guide generation server;

FIG. 4 is a flowchart illustrating a procedure in which a user terminal acquires a program guide;

FIG. 7 is a flowchart illustrating a procedure for calculating an audience situation; and FIG. 8 is a flowchart illustrating a procedure for generating program guide data.

DETAILED DESCRIPTION OF THE PREFERRED EMBODIMENTS

Hereinafter, one preferred embodiment of the present invention will be described in detail with reference to the accompanying drawings.

(1-1) Overall Structure of Program Guide Providing System

Figure 1:
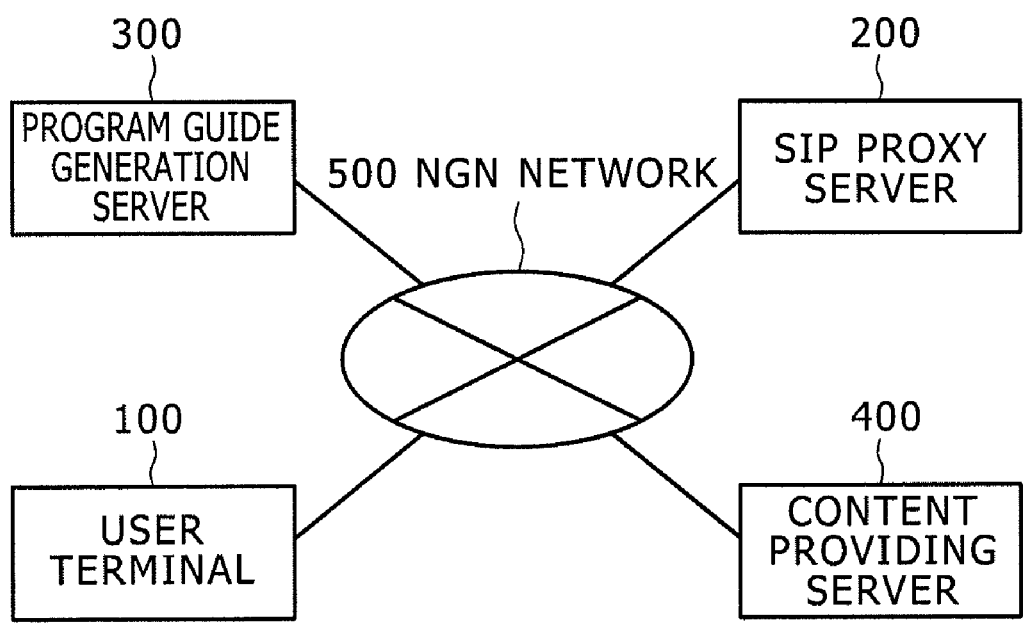
FIG. 1 is a block diagram illustrating an overall structure of a program guide providing system.

FIG. 1 illustrates a program guide providing system 1. The program guide providing system 1 includes a user terminal 100, a SIP proxy server (SIP proxy) 200, a program guide generation server 300, a content providing server 400, and a next generation network (NGN) network (a next-generation IP telephone switching network) 500. Each of the user terminal 100, the SIP proxy server 200, the program guide generation server 300, and the content providing server 400 is connected to the NGN network 500. The NGN network 500 is a communication network that performs session control using the session initiation protocol (SIP).

In this system, each of the user terminal 100, the program guide generation server 300, and the content providing server 400 operates as a SIP user agent (SIP UA). The SIP UA is a SIP user agent that generates and transmits a SIP request, and receives and handles a response thereto.

On the other hand, the SIP proxy server 200 operates as a SIP server that receives and handles the SIP request transmitted from any SIP UA, and generates and transmits the response thereto. In the following descriptions, the terms "SIP UA" and "UA" refer to the user terminal 100, the program guide generation server 300, or the content providing server 400.

Note that the number of user terminals 100 may be more than one. However, in order to simplify the description, it is assumed here that the number of user terminals 100 is one. Each of the user terminal 100, the program guide generation server 300, and the content providing server 400 uses a REGISTER method to register information about itself (information that indicates its location on the network) with the SIP proxy server 200. The information registered therewith is, for example, a SIP uniform resource identifier (URI), an IP address, and so on of the user terminal 100, the program guide generation server 300, or the content providing server 400.

The SIP proxy server 200 is a server that performs routing of SIP messages. The SIP proxy server 200 makes an inquiry at a location server (not shown) using a destination address (SIP address) included in a SIP header as a key to acquire an Internet protocol (IP) address of a destination, and determines a destination of message routing based on the acquired IP address. That is, the location server stores pairs of SIP addresses and IP addresses associated with each other, and allows acquisition of the IP address corresponding to the destination SIP address. The destination of the message routing is the IP address of the destination or another SIP proxy server. The method of this message routing is the same as mail routing in the simple mail transfer protocol (SMTP). The SIP URI in the SIP corresponds to a telephone number, and has the same format as that of a mail address, "name@domain," while "sip:" is added at the top. An example of the SIP URI is "sip:xxx@mail.com."

(1-2) Structure of Each Component of Program Guide Providing System

Figure 2:
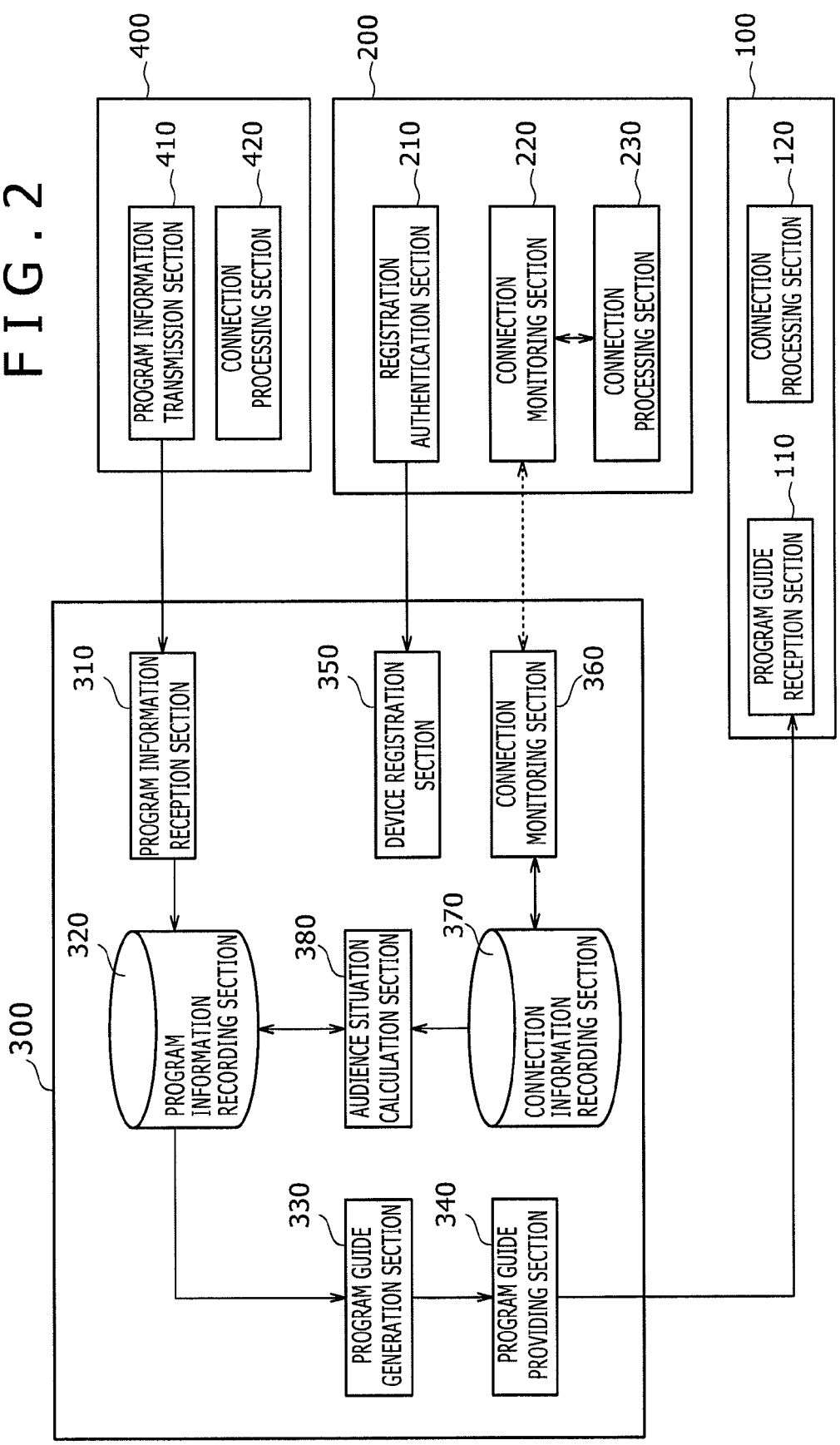
FIG. 2 is a block diagram illustrating an exemplary structure of each component of the program guide providing system as shown in FIG. 1.

FIG. 2 illustrates an exemplary structure of each component of the program guide providing system as shown in FIG. 1. The user terminal 100 includes a program guide reception section 110 and a connection processing section 120. The program guide reception section 110 receives, via the SIP proxy server 200 and the NGN network 500, a program guide provided from the program guide generation server 300. The connection processing section 120 performs control of transmission and reception of a variety of SIP messages, including those concerning connection control (signaling) in relation to the SIP proxy server 200, such as connection request, connection setup, and disconnection.

The connection processing section 120 uses the REGISTER method to register information about itself (information that indicates the location of the user terminal 100 on the network) with the SIP proxy server 200. The information registered therewith is, for example, the SIP URI, the IP address, and so on of the user terminal 100.

The SIP proxy server 200 relays communication from the user terminal 100 to the content providing server 400 or the program guide generation server 300, and communication between the user terminal 100 and the program guide generation server 300. The SIP proxy server 200 includes a registration authentication section 210, a connection monitoring section 220, and a connection processing section 230.

The registration authentication section 210 is a functional part for receiving a REGISTER message from the SIP UA and accepting a registration request. The registration authentication section 210 receives the REGISTER message, and updates a registration database (not shown). Specifically, sender information, such as the SIP URI or the IP address, specified in the REGISTER message is registered in the database as an address of the SIP UA. As a result, the UA becomes capable of receiving, via the SIP proxy server 200, any SIP message transmitted from another UA using its unique SIP URI. Note that the registration authentication section 210 may authenticate registrability of the sending UA after receiving the REGISTER message.

The connection monitoring section 220 extracts connection information, i.e., log information (a date/time of forwarding of the SIP message, records of the destination, sender, and so on of the SIP message), concerning each of the SIP addresses of programs provided from a connection monitoring section 360 of the program guide generation server 300. All SIP processes performed in the connection processing section 230 are normally recorded as log information in a storage device (not shown) in the SIP proxy server 200. Accordingly, the connection monitoring section 220 extracts, from this log information, the connection information (i.e., the destination, the sender, the time, etc.) concerning each of the SIP addresses of the programs.

The connection processing section 230 is a functional part for performing the SIP processes, such as accepting the connection request from any SIP UA and forwarding the request to the destination SIP UA. For example, the connection processing section 230 receives a PUBLISH message transmitted from the content providing server 400 toward the program guide generation server 300, obtains the IP address of the program guide generation server 300 using the destination address included in its header as a key, and forwards the received PUBLISH message to that IP address.

The content providing server 400 includes a program information transmission section 410 and a connection processing section 420. The program information transmission section 410 transmits program information to the program guide generation server 300. The connection processing section 420 performs the SIP processes. For example, the connection processing section 420 uses the REGISTER method to register the information about itself (i.e., the information that indicates the location of the content providing server 400 on the network, such as the SIP URI, the IP address, and so on of the content providing server 400) with the SIP proxy server 200.

Contents provided by the content providing server 400 are composed of a program providing service of providing video or audio contents and services related to the programs. Examples of such related services include quizzes and chats in which users are permitted to participate, and an inquiry service of receiving claims or the like from the users. Each content service included in each program is assigned a separate SIP address, and the user is able to enjoy a desired service by accessing the SIP address of the desired service.

Each piece of program information is generated for one program. That is, each program has one piece of program information. The program information includes: information (SIP address information) that is necessary for a user of the user terminal 100 to access the content providing server 400; the maximum permissible number of audiences at a time; charging condition; target ages; a program genre; program meta-information concerning the program; server load information; blog entry information; and so on. The program information is registered in a database (not shown) in the content providing server 400 on a program-by-program basis.

As the SIP address information, a SIP address for viewing a video (sip:progA@tvxxx.co.jp), a SIP address for participating in a quiz (sip:progA-quiz@tvxxx.co.jp), a SIP address for participating in a chat (sip:progA-chat@tvxxx.co.jp), and a SIP address for making an inquiry (sip:progA-query@tvxxx.co.jp) are registered in the database, for example. In addition, in the database are registered, for example: "20000" as the maximum permissible number of audiences at a time; "monthly contract or 100 yen per access" as the charging condition; "Not specified" as the target ages; "quiz program" as the program genre; "theme song, performer A, sponsoring companies, etc." as the program meta-information; "resource usage rate of 60%" as the server load information; and "264 hits (e.g., the number of search hits, the number of trackbacks, etc.) as the blog entry information.

The program guide generation server 300 includes a program information reception section 310, a program information recording section 320, and a program guide generation section 330. The program information reception section 310 receives the program information of each program provided from the content providing server 400. The program information recording section 320 records the program information of each program received by the program information reception section 310, and also records an audience situation calculated with respect to each program. The program guide generation section 330 assigns an indicator to each program based on the program information and the audience situation thereof recorded in the program information recording section 320, and generates a program guide showing the indicator-assigned programs in an extensible markup language (XML)/hypertext markup language (HTML) format or the like.

The indicator assigned to each program is referred to when evaluating the program. Examples of such indicators include those that can be used to identify the quality of the program, such as the number of views, an audience rating, and the extent of complaint. It is possible to generate a program guide in which the programs are arranged in descending order of popularity, for example, based on the indicator assigned to each program. It is also possible to generate a program guide in which very popular programs are shown in a different color from that of the other programs so that the very popular programs will be highlighted. Still further, it is also possible to generate a program guide in which programs about which many complaints have been made are shown in a different color from that of the other programs.

The program guide generation server 300 further includes a program guide providing section 340, a device registration section 350, the connection monitoring section 360, a connection information recording section 370, and an audience situation calculation section 380. The program guide providing section 340 uses a NOTIFY method to notify the program guide generated by the program guide generation section 330 to the user terminal 100 via the SIP proxy server 200, in response to a notification request using a SUBSCRIBE method received from the user terminal 100 via the SIP proxy server 200. The device registration section 350 registers information (the SIP URI, the IP address, and so on) about the program guide generation server 300 with the SIP proxy server 200. The connection monitoring section 360 regularly requests the connection monitoring section 220 of the SIP proxy server 200 to transmit the connection information to acquire the connection information, and records the acquired connection information on the connection information recording section 370. The connection information recording section 370 is a section on which the connection information is recorded. The audience situation calculation section 380 reads the connection information from the connection information recording section 370 to calculate the audience situation, and records the audience situation on the program information recording section 320.

A procedure in which the program guide generation server 300 acquires the connection information from the SIP proxy server 200 will now be described below. First, the connection monitoring section 360 of the program guide generation server 300 acquires the SIP address of each program from the program information recording section 320 of the program guide generation server 300, and provides the SIP address of each program to the connection monitoring section 220 of the SIP proxy server 200. The connection monitoring section 220 of the SIP proxy server 200 stores the SIP address of each program provided from the program guide generation server 300.

Next, the connection monitoring section 220 of the SIP proxy server 200 extracts, from the log information about the SIP processes performed in the connection processing section 230, the connection information concerning each SIP address provided from the program guide generation server 300. When the SIP processes are performed in the connection processing section 230, information about all the SIP processes is outputted as the log information (a logging function), and the connection monitoring section 220 extracts, from the outputted log information, the connection information that includes any of the SIP addresses of the programs.

Next, the connection monitoring section 360 of the program guide generation server 300 requests the connection monitoring section 220 of the SIP proxy server 200 to regularly provide the connection information, and in response to the request from the connection monitoring section 360 of the program guide generation server 300, the connection monitoring section 220 of the SIP proxy server 200 provides, to the connection monitoring section 360 of the program guide generation server 300, the connection information that includes any of the SIP addresses of the programs.

Next, the connection monitoring section 360 of the program guide generation server 300 supplies the received connection information to the connection information recording section 370, so that the received connection information is recorded on the connection information recording section 370. In the above-described procedure, the program guide generation server 300 acquires the connection information concerning each of the SIP addresses of the programs from the SIP proxy server 200, and records the acquired connection information therein.

FIG. 3 is a flowchart illustrating a procedure in which the content providing server 400 delivers the program information to the program guide generation server 300. First, at step SP1, the program guide generation server 300 uses the REGISTER method to register the information about itself (i.e., the information that indicates the location of the program guide generation server 300 on the network; for example, the SIP URI, the IP address, and so on thereof) with the SIP proxy server 200.

Next, at step SP2, the content providing server 400 uses the REGISTER method to register the information about itself (i.e., the information that indicates the location of the content providing server 400 on the network; for example, the SIP URI, the IP address, and so on thereof) with the SIP proxy server 200. Next, at step SP3, the content providing server 400 uses a PUBLISH method to transmit the program information to the program guide generation server 300 via the SIP proxy server 200. At step SP4, the SIP proxy server 200 forwards the PUBLISH message to the program guide generation server 300. At step SP5, the program guide generation server 300 stores the program information, which has been provided from the content providing server 400 via the SIP proxy server 200, in the program information recording section 320.

FIG. 4 is a flowchart illustrating a procedure in which the user terminal 100 acquires the program guide. First, at step SP11, the user terminal 100 uses the REGISTER method to register the information about itself (i.e., the information that indicates the location of the user terminal 100 on the network; for example, the SIP URI, the IP address, and so on thereof) with the SIP proxy server 200. Next, at step SP12, the user terminal 100 uses the SUBSCRIBE method to request, via the SIP proxy server 200, the program guide generation server 300 to provide the program guide.

Next, at step SP13, the SIP proxy server 200 forwards a SUBSCRIBE message from the user terminal 100 to the program guide generation server 300. Next, at step SP14, in response to the SUBSCRIBE message transmitted from the user terminal 100 via the SIP proxy server 200, the program guide generation server 300 uses the NOTIFY method to transmit program guide data D1 to the user terminal 100 via the SIP proxy server 200. The SIP proxy server 200 forwards a NOTIFY message from the program guide generation server 300 to the user terminal 100.

Next, at step SP15, the program guide reception section 110 of the user terminal 100 receives the program guide data D1, which has been transmitted from the program guide generation server 300 via the SIP proxy server 200, and stores the program guide data D1 in a storage device (not shown) or displays the program guide data D1 on a display device (not shown).

Figure 5:
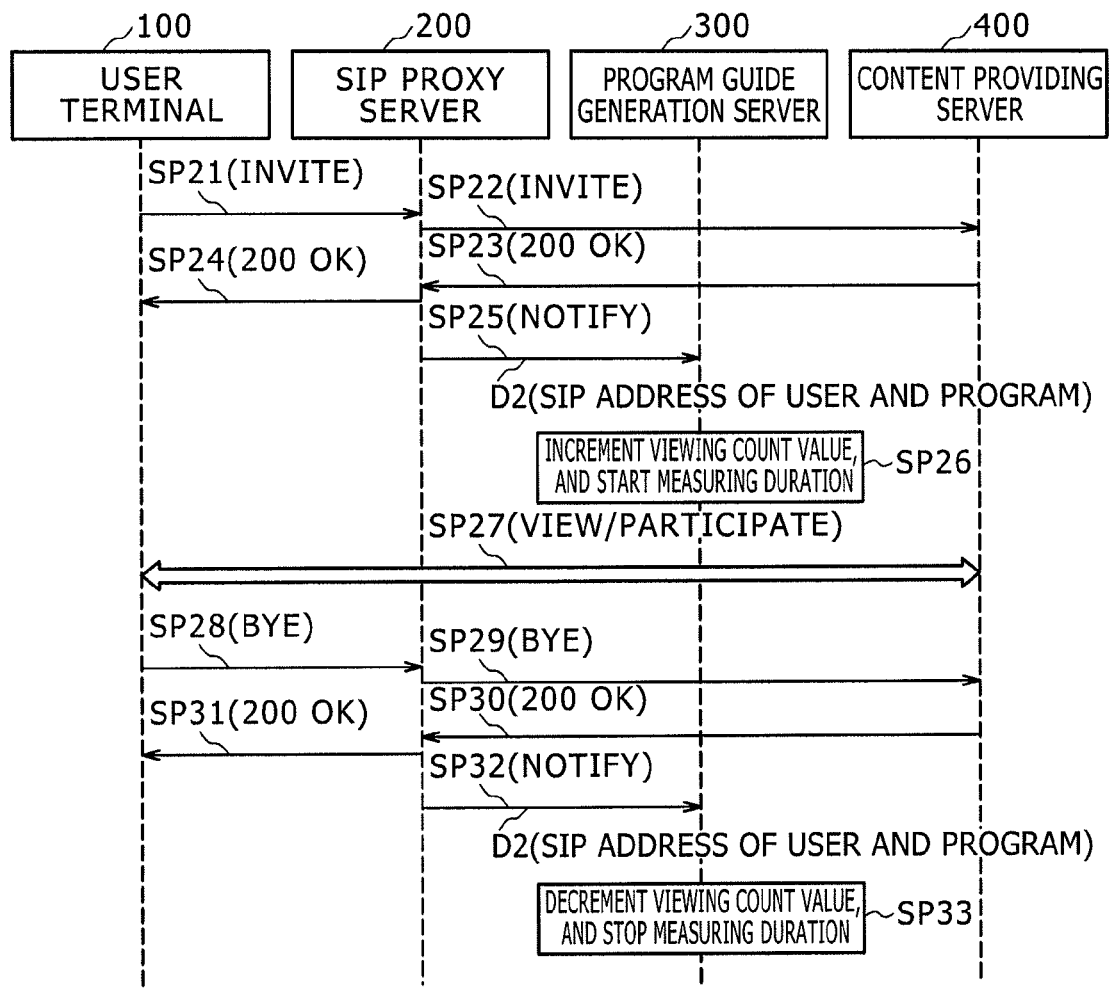
FIG. 5 is a sequence diagram illustrating an exemplary process of user viewing (success in viewing)

FIG. 5 is a flowchart illustrating a procedure in which the user terminal 100 views a program provided from the content providing server 400. Suppose that the user operates the user terminal 100 to issue an instruction to view a content service belonging to program A. Then, first, at step SP21, the connection processing section 120 of the user terminal 100 uses an INVITE method to make a request to view program A to the content providing server 400 via the SIP proxy server 200. At step SP22, the SIP proxy server 200 forwards an INVITE message from the user terminal 100 to the content providing server 400.

Next, at step SP23, in response to the request to view the content service belonging to program A as made by the INVITE message transmitted from the user terminal 100 via the SIP proxy server 200, the content providing server 400 transmits a response code "200 OK" (successful response: the request has been understood and accepted) to the user terminal 100 via the SIP proxy server 200. At step SP24, the SIP proxy server 200 forwards the response code transmitted from the content providing server 400 to the user terminal 100.

Next, at step SP25, the SIP proxy server 200 records viewing data D2 that includes: information about the content service belonging to program A, the request for viewing of which the user terminal 100 has made to the content providing server 400; the SIP address of the user terminal 100; the response code "200 OK" transmitted from the content providing server 400 in response to the INVITE message; time information; and so on. In addition, in the case where the SIP proxy server 200 has been requested by the program guide generation server 300 to provide viewing data concerning program A to the program guide generation server 300, the SIP proxy server 200 provides the viewing data D2 to the program guide generation server 300.

At step SP26, upon receipt of the viewing data D2, the program guide generation server 300 increments, by one, a viewing count value for the content service belonging to program A as described in the viewing data D2, and starts measuring the duration of the viewing of the content service by the user terminal 100.

Next, at step SP27, the user terminal 100 and the content providing server 400 are connected to each other via the NGN network 500 without the intermediation of the SIP proxy server 200, and video of program A is displayed on the display device (not shown) of the user terminal 100 while audio of program A is outputted via a loudspeaker (not shown). In addition, the user is able to participate in a quiz or a chat, which are services related to program A, by using the user terminal 100. In addition, the user is also able to make an inquiry. When there is a desire to enjoy any of such related services, the user terminal 100 transmits the INVITE message to the SIP address for the desired related service. The subsequent steps to be followed are similar to those in the procedure for viewing program A.

When finishing the viewing of the content service belonging to program A, the user operates the user terminal 100 to issue an instruction to finish the viewing of the content service. As a result, at step SP28, the connection processing section 120 of the user terminal 100 uses a BYE method to make a request to finish the viewing to the content providing server 400 via the SIP proxy server 200. Next, at step SP29, the SIP proxy server 200 forwards a BYE message from the user terminal 100 to the content providing server 400.

Next, at step SP30, upon receipt of the request to finish the viewing using the BYE method as transmitted from the user terminal 100 via the SIP proxy server 200, the content providing server 400, in response thereto, transmits the response code "200 OK" to the user terminal 100 via the SIP proxy server 200, and stops the provision of program A to the user terminal 100.

Next, at step SP31, the SIP proxy server 200 forwards the response code from the content providing server 400 to the user terminal 100. Next, at step SP32, the SIP proxy server 200 provides, to the program guide generation server 300, viewing data D2 that includes: the information about the content service belonging to program A, the request to finish the viewing of which the user terminal 100 has made to the content providing server 400; the SIP address of the user terminal 100; the response code transmitted from the content providing server 400 in response to the BYE message; time information; and so on.

Next, at step SP33, upon receipt of the viewing data D2 transmitted from the SIP proxy server 200, the program guide generation server 300 decrements, by one, the viewing count value for the content service belonging to program A, the request to finish the viewing of which the user terminal 100 has made, stops measuring the duration of the viewing of the content service by the user terminal 100, and records the duration of the viewing of the content service.

Figure 6:
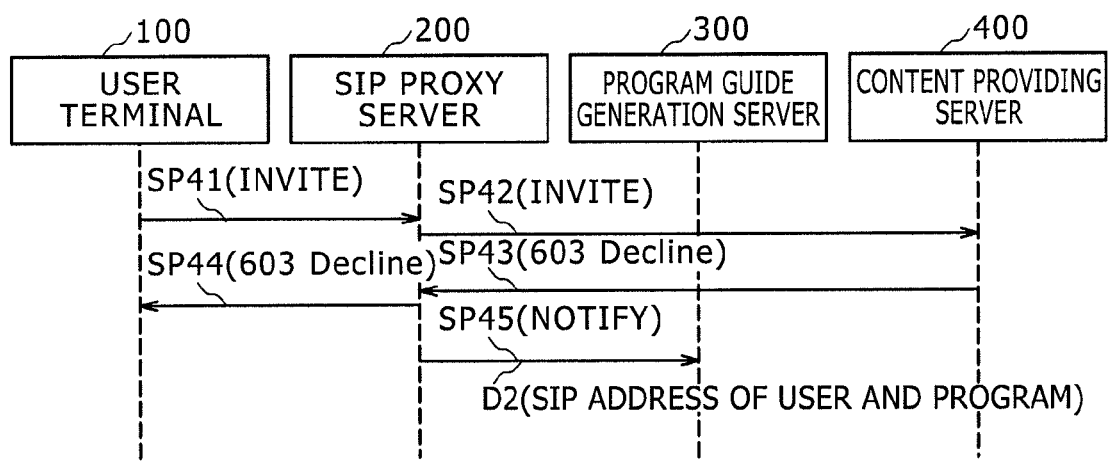
FIG. 6 is a sequence diagram illustrating an exemplary process of user viewing (failure in viewing)

FIG. 6 is a sequence diagram illustrating an exemplary process of user viewing (failure in viewing). In other words, FIG. 6 illustrates a procedure in the case where the user terminal 100 attempts to view the program provided by the content providing server 400, but without success. Suppose that the user operates the user terminal 100 to issue the instruction to view the content service belonging to program A. Then, first, at step SP41, the connection processing section 120 of the user terminal 100 uses the INVITE method to make a request to view program A to the content providing server 400 via the SIP proxy server 200. At step SP42, the SIP proxy server 200 forwards the INVITE message from the user terminal 100 to the content providing server 400.

Next, at step SP43, in response to the request to view the content service belonging to program A as made by the INVITE method transmitted from the user terminal 100 via the SIP proxy server 200, the content providing server 400 transmits a response code (e.g., "603 Decline" (failure response: the request cannot be handled)) to the user terminal 100 via the SIP proxy server 200. At step SP44, the SIP proxy server 200 forwards the response code transmitted from the content providing server 400 to the user terminal 100.

Next, at step SP45, the SIP proxy server 200 provides, to the program guide generation server 300, viewing data D2 that includes: information about program A, the request for the viewing of which the user terminal 100 has made to the content providing server 400; the SIP address of the user terminal 100; the response code ("603 Decline") transmitted from the content providing server 400 in response to the INVITE message; time information; and so on.

At present, response codes that may be outputted when conditions for connection are not satisfied, such as when the content providing server 400 has run out of capacity for connection, are "600 Busy Everywhere" and "603 Decline," for example. Note, however, that other response codes may be outputted in such a case.

Suppose that the user terminal 100 has made a request to view a certain program to the content providing server 400, but the connection processing section 420 of the content providing server 400 returns a failure response, that is, the viewing of the program ends in failure (failure in connection). In this case, the connection information obtained by the SIP proxy server 200, which receives the failure response, is recorded by the connection monitoring section 360 of the program guide generation server 300 on the connection information recording section 370. Therefore, based on the connection information recorded on the connection information recording section 370, the audience situation calculation section 380 determines that the program is being accessed by more viewers than the maximum possible number of viewers for the program, i.e., that the program is popular, for example.

FIG. 7 is a flowchart illustrating a procedure for calculating the audience situation. This procedure is performed by the audience situation calculation section 380 of the program guide generation server 300. First, at step SP51, the audience situation calculation section 380 acquires the connection information recorded on the connection information recording section 370. The connection information has been acquired from the log of the SIP message processes performed in the SIP proxy server 200. The connection information includes the types of the SIP message, such as the INVITE message or the BYE message, and a message responding thereto, the destination, the sender, the time, and so on.

Next, at step SP52, the connection information is searched for any connection address. For example, the connection information that includes the SIP address of program A as the destination or the sender is searched for. Next, at step SP53, it is determined whether any connection address has been found. If it is determined that no connection address has been found, this procedure is finished. Meanwhile, if it is determined that any connection address has been found, control proceeds to step SP54.

At step SP54, it is determined whether the SIP message is any successful response message (e.g., the response code "200 OK," etc.) responding to the INVITE message. If it is determined that the SIP message is any successful response message responding to the INVITE message, control proceeds to step SP55, and a count value that indicates the number of views for the relevant program is incremented by one. Next, at step SP56, a viewing start time of the relevant user terminal 100 is registered in a memory (not shown). Thereafter, control proceeds to step SP64.

Meanwhile, if it is determined at step SP54 that the SIP message is not any successful response message responding to the INVITE message, control proceeds to step SP57. At step SP57, it is determined whether the SIP message is any connection failure response message (e.g., the response code "603 Decline," etc.) responding to the INVITE message. If it is determined that the SIP message is any connection failure response message responding to the INVITE message, control proceeds to step SP58.

At step SP58, a reason for the failure in connection is recorded on the memory. Examples of the reason for the failure in connection include excessive accesses to the server and failure in satisfying user connection requirements. Thereafter, control proceeds to step SP64. Meanwhile, if it is determined at step SP57 that the SIP message is not any connection failure response message responding to the INVITE message, control proceeds to step SP59.

At step SP59, it is determined whether the SIP message is any successful response message responding to the BYE message. If it is determined that the SIP message is not any successful response message responding to the BYE message, this procedure is finished. Meanwhile, if it is determined that the SIP message is any successful response message responding to the BYE message, control proceeds to step SP60.

At step SP60, the connection information is searched for any user identifier (ID) (the SIP address of the user terminal 100). Next, if it is determined at step SP61 that the SIP address of the user terminal 100 has not been found, this procedure is finished. Meanwhile, if it is determined at step SP61 that the SIP address of the user terminal 100 has been found, control proceeds to step SP62, and the count value that indicates the number of views for the relevant program is decremented by one. Thereafter, control proceeds to step SP63. At step SP63, the length of time between the viewing start time as registered at step SP56 and the time included in the SIP message is measured to calculate the duration of the viewing, and the duration is recorded on the memory. Thereafter, control proceeds to step SP64.

At step SP64, the count value that indicates the number of views and the duration as registered in the memory by the audience situation calculation section 380 are supplied to the program information recording section 320 and recorded thereon. Thereafter, this procedure is finished. All data included in the connection information can be processed by repeating the processes of step SP52 and the subsequent steps in the procedure as shown in FIG. 7.

Suppose, for example, that the user attempts to make an inquiry at the content providing server 400 to make a complaint about a certain program, but a failure response returns from the connection processing section 420 of the content providing server 400, that is, the inquiry ends in failure. In this case, the audience situation calculation section 380 can determine based on the connection information recorded on the connection information recording section 370 that an unacceptable number of audiences are making an inquiry at the content providing server 400 to make a complaint about that program (i.e., the extent of complaint is excessive), that is, that program is not evaluated highly.

Thus, the connection failure (which indicates the degree of congestion) and the extent of complaint can be differentiated depending on the destination of the connection. Specifically, examples of the contents include: video, quiz, and similar services; and the inquiry and chat services used by the users to give opinions including complaints. In the case where an attempt to connect to the video or quiz service ends in failure because the number of current connections thereto exceeds a maximum permissible number, the audience situation calculation section 380 counts the number of connections as positive information that the service is popular. On the other hand, the number of connections to the inquiry or chat service increases only when an abnormal condition, such as a problem, has occurred. Therefore, when the number of connections to the inquiry or chat service exceeds a maximum permissible number, or when the number of connections to the inquiry or chat service does not exceed the maximum permissible number but is large, the audience situation calculation section 380 counts the number of connections as negative information of the extent of complaint. Note, however, that the number of connections to the chat service may increase even when the relevant program is popular. Therefore, the audience situation calculation section 380 may sometimes count the number of connections to the chat service as the positive information. Both of the above cases concern, in SIP terms, the request for the connection to a particular SIP address and whether or not the connection results in success. It is possible to associate positive and negative counts as mentioned above with the SIP address included in the program information, so that such counts can be used as an indicator of the extent of popularity or the extent of complaint for the program corresponding to the SIP address.

FIG. 8 is a flowchart illustrating a procedure for generating the program guide data. This procedure is performed by the program guide generation section 330 of the program guide generation server 300. First, at step SP71, a list of rating items is determined. The list of the rating items may be set in advance. Alternatively, the list of the rating items may be specified by the user each time.

Examples of the rating items (ordering items), which are indicators for program rating, include: the number of views and audience rating for the program; the number of participations in the related service, such as the quiz, in which the users are permitted to participate, and the rate of participation; the number of connections to the related service, such as the chat, that allows the users to communicate while viewing the program, and the rate of connection to the related service (the number of supports and the rate of support); the number of users who have utilized the inquiry service (the extent of complaint or the extent of server congestion); an excessively accessed program ranking (popular program ranking), which is a ranking of programs that are being accessed by a greater number of users than the maximum permissible number of connections; a distribution or average of the durations, i.e., the lengths of time for which the program has been viewed by the users; and a ranking of recommended programs, i.e., other programs accessed by the audiences of the program.

Of the rating items, the number of views and the audience rating refer to the number of user terminals 100 that are viewing a particular program, among the contents such as the programs provided by the content providing server 400, and the proportion (in percentage terms) of the number of such user terminals 100 to the whole number of user terminals 100, respectively. The number of participations and the rate of participation refer to the number of user terminals 100 that are participating in a particular program among audience participation program contents, and the proportion (in percentage terms) of the number of such user terminals 100 to the whole number of user terminals 100, respectively. The number of supports and the rate of support refer to the number of user terminals 100 that are accessing a particular program among the contents, such as the chat, that allow the users to communicate while viewing the content, and the proportion (in percentage terms) of the number of such user terminals 100 to the whole number of user terminals 100, respectively.

The extent of complaint or the extent of server congestion refers to the number of user terminals 100 that have connected to or are attempting to connect to an inquiry number. The excessively accessed program ranking is the ranking of the programs that are being accessed by a greater number of users than the maximum permissible number of connections. The distribution or average of the durations refers to a distribution or average of the lengths of time for which the users have connected to the content. The ranking of the recommended programs refers to a ranking of other contents accessed by the user terminals 100 that connect to the content currently viewed, as determined by the number of accesses. The number of user terminals 100 that are viewing a particular program is calculated by the audience situation calculation section 380 based on the connection information recorded on the connection information recording section 370. Specifically, the audience situation calculation section 380 calculates the total number of pieces of connection information that has the SIP address of that particular program as the destination, and regards this total number as the number of user terminals 100 that are viewing the particular program. The whole number of user terminals 100 is calculated by the audience situation calculation section 380 based on the connection information recorded on the connection information recording section 370. Specifically, the audience situation calculation section 380 calculates the total number of pieces of connection information that has the SIP address of any program as the destination, and regards this total number as the whole number of user terminals 100. The number of participations and the rate of participation, the number of supports and the rate of support, the extent of complaint or the extent of server congestion, the distribution or average of the durations, and the ranking of the recommended programs can also be calculated by the audience situation calculation section 380 based on the connection information recorded on the connection information recording section 370 in similar manners.

Next, at step SP72, one rating item is selected from among the list of the rating items determined at step SP71. Incidentally, in subsequent iterations of step SP72, the other rating items are selected sequentially, one in each iteration. Next, at step SP73, a parameter of the selected rating item is acquired. This parameter is a parameter used to search for and acquire the rating item.

Parameters for the number of views and the audience rating are the number of user terminals 100 that are currently connecting to the content being viewed and the whole number of user terminals 100 that are currently connecting to any content. Parameters for the number of participations and the rate of participation are the number of user terminals 100 that are currently connecting to the content being participated in and the whole number of user terminals 100 that are currently connecting to any content. Parameters for the number of supports and the rate of support are the number of user terminals 100 that are currently connecting to a content that is designated for support and the whole number of user terminals 100 that are currently connecting to any content. Parameters for the extent of complaint or the extent of server congestion are the number of user terminals 100 that have connected to the inquiry number and the number of user terminals 100 that have failed to connect thereto (i.e., the number of failures). A parameter for excessive access is the maximum permissible number of connections for the program and the number of user terminals 100 that have connected to the program. A parameter for the duration is the duration. A parameter for the recommended programs is the log of the connection information.

Next, at step SP74, a query (a character string representing a process request (inquiry)) is sent to the connection information recording section 370 to acquire a list of connection information corresponding to the query. The query may include conditions such as top n items, more than N (N is an integer from 0 to 100) percent, and the program genre.

Next, at step SP75, contents that constitute the program guide are organized. For example, designing for displaying the retrieved connection information and arrangement of thumbnail images or the like are performed using XML/HTML or the like, so that a program guide that is readily understandable to the users is generated.

Next, at step SP76, it is determined whether or not any of the rating items determined at step SP71 remains to be processed. If it is determined that there is any rating item that remains to be processed, control returns to step SP72, and the processes of steps SP72 to SP76 are repeated. Meanwhile, if it is determined that there is no rating item that remains to be processed, control proceeds to step SP77.

At step SP77, a program guide that contains all the rating items is organized, and the generation of the program guide is completed. For example, it is possible to generate a program guide in which programs are arranged in descending order of audience rating or popularity. It is also possible to generate a program guide in which programs that are highly popular or have high audience ratings are shown in a different color from that of the other programs so as to be highlighted. It is also possible to generate a program guide in which programs about which many complaints have been made are shown in a different color from that of the other programs so as to be highlighted.

(2) Operation and Effects

As described above, the connection monitoring section 360 of the program guide generation server 300 acquires the connection information from the connection monitoring section 220 of the SIP proxy server 200, and based on this connection information, the audience situation such as the number of views, the extent of complaint, the duration, and so on of the contents provided by the content providing server 400 is calculated, and the programs are rated, and the program guide that reflects the rating can be generated and delivered to the user terminal 100.

As described above, based on the connection information acquired from the connection monitoring section 220 of the SIP proxy server 200, the audience situation calculation section 380 of the program guide generation server 300 calculates the audience situation such as the number of views, the extent of complaint, the duration, and so on of the contents provided by the content providing server 400, and the programs are rated, and the program guide that reflects the rating is generated and delivered to the user terminal 100. Therefore, the user is able to select a program with increased flexibility and from various standpoints, by referring to the program guide.

(3) Other Embodiments

In the above-described embodiment, the program guide generation server 300 and the SIP proxy server 200 are provided. Note, however, that this is not essential to the present invention. For example, the SIP proxy server 200 and the program guide generation server 300 may be integrated into a single server.

Further, in the above-described embodiment, the connection monitoring section 360 as call connection monitoring means, the connection information recording section 370 as connection data storage means, the audience situation calculation section 380 as audience situation calculation means, the program guide generation section 330 as program guide generation means, and the program guide providing section 340 as program guide providing means combine to form a program guide providing system. Note, however, that this is not essential to the present invention. The program guide providing system may be formed by other varieties of means.

A program guide providing system, a program guide providing apparatus, a program guide providing method, and a program guide providing program according to the present invention can be applied to a variety of cases where contents, including but not limited to video and audio contents, are delivered.

It should be understood by those skilled in the art that various modifications, combinations, sub-combinations and alterations may occur depending on design requirements and other factors insofar as they are within the scope of the appended claims or the equivalents thereof.

What is claimed is:

1. A program guide providing system, comprising:
    a terminal;
    a content providing server configured to provide a content to said terminal;
    a session initiation protocol (SIP) proxy server configured to perform routing of session initiation protocol messages;
    a program guide providing server configured to provide, to said terminal, a list of services offered by said content providing server as a program guide; and
    a next generation network to which said terminal, said content providing server, said session initiation protocol proxy server, and said program guide providing server are connected, wherein,
    said content providing server includes service providing means for providing a variety of programs and a related service to said terminal in response to a request from said terminal, the related service includes as inquiry service which indicates a number of users having a complaint about the content or server congestion and a chat service that allows users to communicate while viewing the program, and
    said program guide providing server includes
        communication history acquisition means for acquiring, via said session initiation protocol proxy server, a communication history between said content providing server and said terminal, the communication history including information about a number of times a SIP address of a program is requested by the users, the duration of connection to the SIP address of the program, the number of connections to both the inquiry service and chat service, and the number of failed attempts to connect to the SIP address of the program,
        communication history storage means for storing the communication history acquired by the communication history acquisition means,
        audience situation calculation means for calculating an audience situation concerning each of the programs based on the information about the number of times the SIP address of the program is requested by the users, the duration of connection to the SIP address of the program, the number of connections to both the inquiry service and chat service, and the number of failed attempts to connect to the SIP address of the program stored in the communication history storage means,
        program guide generation means for assigning an indicator to each program based on the audience situation calculated by the audience situation calculation means, and generating a program guide in which each program is assigned the indicator, and
        program guide providing means for providing the program guide generated by the program guide generation means to said terminal.

2. The program guide providing system according to claim 1, wherein the audience situation calculation means retrieves, from the communication history, a communication history corresponding to each of the variety of programs and the related service to calculate the audience situation on a program-by-program basis.

3. The program guide providing system according to claim 1, wherein the program guide generation means generates a program guide in which the programs are ordered based on an indicator calculated based on the audience situation.

4. A program guide providing apparatus for providing a program guide via a next generation network, the apparatus comprising:
    call connection monitoring means for monitoring, via a session initiation protocol proxy server, a call connection from a terminal to a connection address corresponding to any of a variety of programs and a related service provided by a content providing server that provides the variety of programs and the related service to the terminal in response to a request from the terminal, the terminal being connected to the next generation network, the related service includes an inquiry service which indicates a number of users having a complaint about the content or server congestion and a chat service that allows users to communicate while viewing the program;
    connection data storage means for storing connection data obtained by the monitoring of said call connection monitoring means, the connection data including information about a number of times a SIP address of a program is requested by the users, the duration of connection to the SIP address of the program, the number of connections to both the inquiry service and chat service, and the number of failed attempts to connect to the SIP address of the program;
    audience situation calculation means for calculating an audience situation based on the information about the number of times the SIP address of the program is requested by the users, the duration of connection to the SIP address of the program, the number of connections to both the inquiry service and chat service, and the number of failed attempts to connect to the SIP address of the program stored in said connection data storage means;

program guide generation means for generating the program guide based on the audience situation calculated by said audience situation calculation means; and program guide providing means for providing the program guide generated by said program guide generation means to the terminal.

5. A program guide providing method for providing a program guide via a next generation network, the method comprising the steps of:

monitoring, via a session initiation protocol (SIP) proxy server, a call connection from a terminal to a connection address corresponding to any of a variety of programs and a related service provided by a content providing server that provides the variety of programs and the related service to the terminal in response to a request from the terminal, the terminal being connected to the next generation network, the related service includes an inquiry service which indicates a number of users having a complaint about the content or server congestion and a chat service that allows users to communicate while viewing the program;

storing a log of the call connection monitored in said monitoring step as connection data, the connection data including information about a number of times a SIP address of a program is requested by the users, the duration of connection to the SIP address of the program, the number of connections to both the inquiry service and chat service, and the number of failed attempts to connect to the SIP address of the program:

calculating an audience situation based on information about the number of times the SIP address of the program is requested by the users, the duration of connection to the SIP of the program, the number of connections to both the inquiry service and chat service, and the number of failed attempts to connect to the SIP address of the program stored in said storing step;

generating the program guide based on the audience situation calculated in said calculating step; and providing the program guide generated in said generating step to the terminal.

6. A program guide providing program, embodied on a non-transitory computer readable medium, for providing a program guide via a next generation network, the program causing a computer to perform the steps of:

monitoring, via a session initiation protocol (SIP) proxy server, a call connection from a terminal to a connection address corresponding to any of a variety of programs and a related service provided by a content providing server that provides the variety of programs and the related service to the terminal in response to a request from the terminal, the terminal being connected to the next generation network, the related service includes an inquiry service which indicates a number of users having a complaint about the content or server congestion and a chat service that allows users to communicate while viewing the program;

storing a log of the call connection monitored in said monitoring step as connection data, the connection data including information about a number of times a SIP address of a program is requested by the users, the duration of connection to the SIP address of the program, the number of connections to both the inquiry service and chat service, and the number of failed attempts to connect to the SIP address of the program;

calculating an audience situation based on the information about the number of times the SIP address of the program is requested by the users, the duration of connection to the SIP address of the program, the number of connections to both the inquiry service and chat service, and the number of failed attempts to connect to the SIP address of the program stored in said storing step;

generating the program guide based on the audience situation calculated in said calculating step; and providing the program guide generated in said generating step to the terminal.

7. A program guide providing apparatus for providing a program guide via a next generation network, the apparatus comprising:

a call connection monitoring section configured to monitor, via a session initiation protocol (SIP) proxy server, a call connection from a terminal to a connection address corresponding to any of a variety of programs and a related service provided by a content providing server that provides the variety of programs and the related service to the terminal in response to a request from the terminal, the terminal being connected to the next generation network, the related service includes an inquiry service which indicates a number of users having a complaint about the content or server congestion and a chat service that allows users to communicate while viewing the program;

a connection data storage section configured to store connection data obtained by the monitoring of said call connection monitoring section, the connection data including information about a number of times a SIP address of a program is requested by the users, the duration of connection to the SIP address of the program, the number of connections to both the inquiry service and chat service, and the number of failed attempts to connect to the SIP address of the program;

an audience situation calculation section configured to calculate an audience situation based on the information about the number of times the SIP address of the program is requested by the users, the duration of connection to the SIP address of the program, the number of connections to both the inquiry service and chat service, and the number of failed attempts to connect to the SIP address of the program stored in said connection data storage section;

a program guide generation section configured to generate the program guide based on the audience situation calculated by said audience situation calculation section; and a program guide providing section configured to provide the program guide generated by said program guide generation section to the terminal.

* * * * *